Aug. 9, 1966 H. N. DIEFFENBACH 3,264,962
REMOVABLE FILM PROCESS MAGAZINE
Filed Jan 29, 1964 2 Sheets-Sheet 1
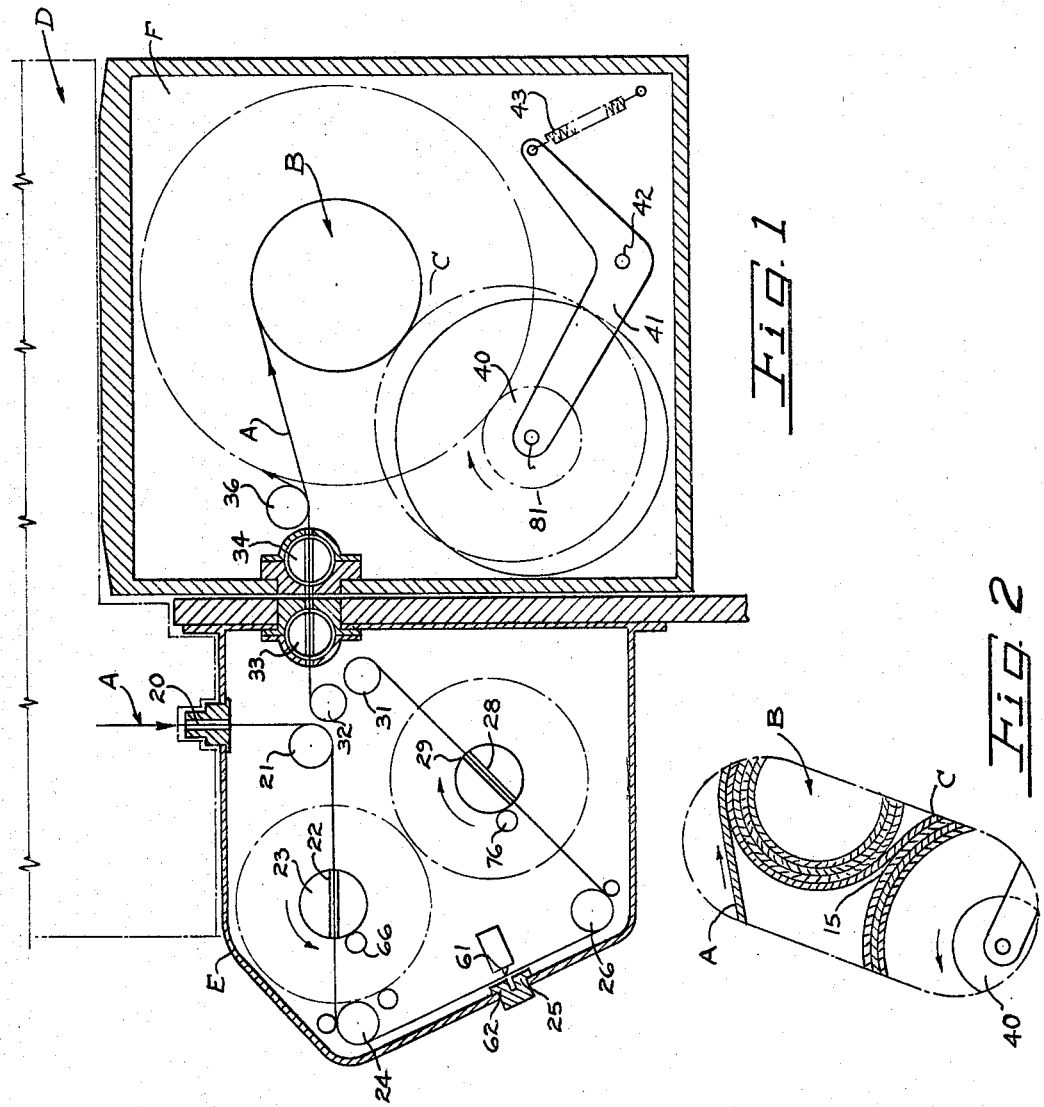
INVENTOR.
HARRY N. DIEFFENBACH
BY
Townsend and Townsend
ATTORNEYS

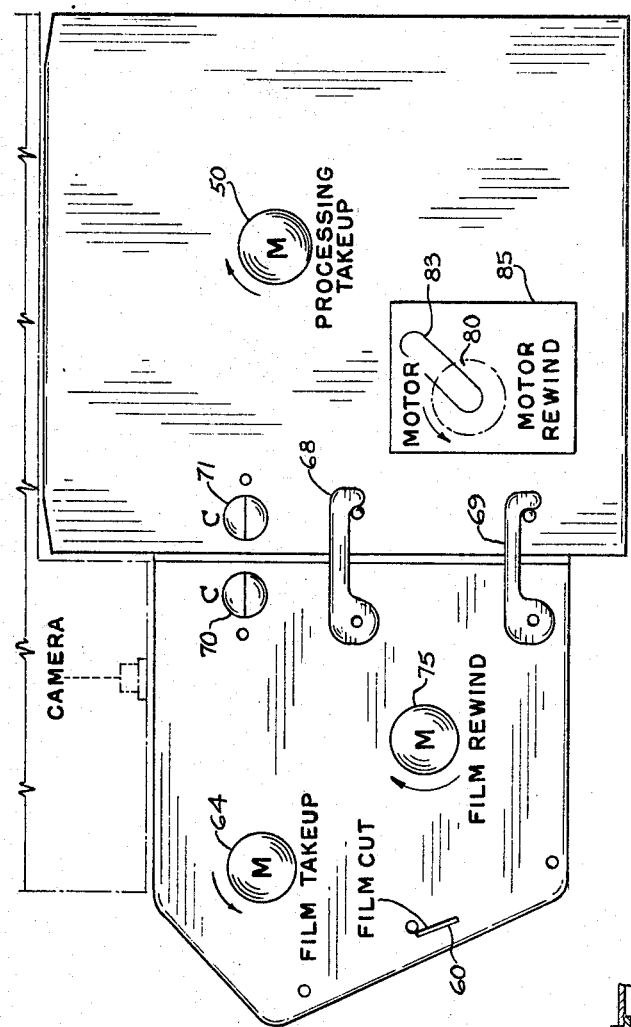
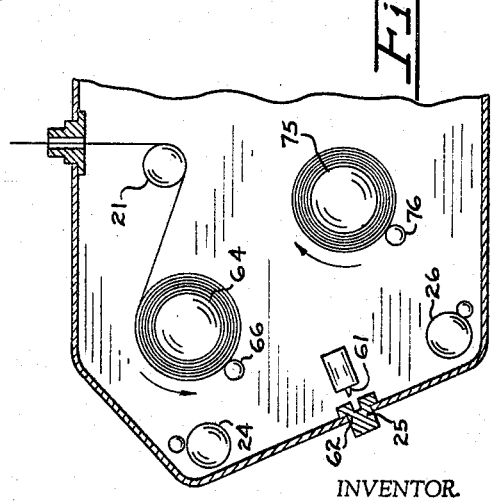

United States Patent Office 3,264,962
Patented August 9, 1966.

3,264,962
REMOVABLE FILM PROCESS MAGAZINE
Harry N. Dieffenbach, Fremont, Calif., assignor to Mark Systems, Inc., Santa Clara, Calif.
Filed Jan. 29, 1964, Ser. No. 340,870
5 Claims. (Cl. 95—13)

This invention relates to a photographic film processing unit for use with cameras and is related to patent application, Serial No. 315,147, filed on October 10, 1963 in the name of Harry N. Dieffenbach, which are both assigned to common assignee.

Eastman Kodak and possibly others have developed a film process by which a film carrying a photographic emulsion is processed to render an independent negative and a positive of the image photographed. The process is referred to as the "Bimat" type process of Eastman Kodak and generally comprises the use of a mat of film carrying an emulsion which is soaked in a developing solution. Development of the initial negative and the rendition of a positive are accomplished by mating the emulsion side of the negative film with the emulsion side of the developer fluid carrying mat. When the film and the mat are compressed together, development occurs by causing the relatively unexposed portions of the exposed film to be transferred onto the mat and the relatively exposed portions of the emulsions to be retained on the film. There is, of course, a gradation of control which provides the more or less continuous tone image characteristic of the ordinary contrast of standard photographic materials. The aforesaid photographic process is completed in approximately 10 to 15 minutes after the union of the two sheets of material, i.e. the film and the mat under the present state of the art, and can remain in united condition for a substantial period of time without undesirable effects.

The principal object of this invention is to provide a mechanical film and mat take-up reel assembly in which the film is passed through two reels within a light sealed chamber into a second chamber into which the mat and the film are combined on a take-up reel for processing.

In devices that use the aforesaid type of material a magazine is conventionally attached to a camera. The magazine is arranged to carry the mat material which is combined with the film from the camera onto a single roll under pressure so that the mat and the film can be processed immediately after the exposure of the film by the camera. It has been found that in the use of such equipment it is desirable to look at or examine a good portion of the film after processing without disabling the camera from taking subsequent exposures on the remaining film. In other applications it is desirable to provide means for separating the processed film material from the processed positive mat material so that the mat material can be sent to a location for immediate use, and the negative material or film can be retained with the camera mechanism. The apparatus of this invention allows both of these objectives to be alternatively or simultaneously achieved.

In the present invention a mechanism is provided in the first chamber for severing the film and rewinding the film onto a spool carried within the chamber by withdrawing it from the processing reel, and at the same time provision is made in the processing chamber for rewinding the processed mat material back onto its take-up spool.

A feature and advantage of this invention lies in the arrangement wherein the second compartment can be removed from the first compartment either before or after the film has been wound onto a reel in the first chamber.

The device of this invention is further characterized by providing a take-up reel for receiving film from an associated camera after the lead portion of the film has been transferred to the processing chamber. This facilitates the continued use of the camera mechanism while still allowing a portion of the film to be processed and removed from the camera mechanism for delivery to another location for examination and viewing.

Another object of the invention is to provide a two part magazine for a camera. The first part of the magazine is provided with two take-up spools, both being apertured to allow film tracking through the aperture of the spools to a point of exit from the film chamber. The second adjacent magazine is arranged to receive the film for winding onto a take-up reel together with mat material arranged to be reeled onto the take-up reel with the film to effect the mat-film processing. When required, one of the reels in the first chamber can be employed to wind the processed film from the second chamber onto the reel in the first chamber while simultaneously the mat material is rewound onto its supply roller or reel. The remaining reel in the first magazine thereafter is operable to function as a take-up reel for the lead end of the remaining film received from the camera, so that the camera can continue supplying film to the first section of the magazine without interruption and during the interval that the processed portion of the film is either removed from the first chamber or wound onto a reel carried within the first chamber.

The foregoing objects, features and advantages as well as others will be apparent from reading the following specification and attached drawing in which:

FIG. 1 is a cross-sectional view showing the two magazines of the invention and their operating components.

FIG. 2 is an enlarged view showing the reeling of the film and mat material onto a take-up reel.

FIG. 3 is a side view showing the one exterior side of the two magazines; and

FIG. 4 is a partial view of one of the film magazines showing the processed film rewound onto one reel and the exposed unprocessed film being wound on the other reel in the magazine.

Within the present invention film A is reeled onto a take-up spool B. Mat C, impregnated with developing solution, is thence arranged to engage the film reel at a point of tangency 15 so that the mat and film will be in intimate contact for processing. The aforesaid process and arrangement of reels is disclosed in detail in patent application, Serial No. 315,147, filed October 10, 1963. Film A received from a camera, generally indicated at D, is fed into a first or receiving magazine E, is passed through a series of guides, and thence is exited into a second or processing magazine F onto take-up reel B contained within magazine F where the mat material C is combined onto take-up reel B. The interior of magazine E comprises an entry slot 20 through which film passes in light tight condition into the magazine. The film is then guided by a guide roller 21 through a slot 22 of a take-up reel 23. Slot 22 when aligned with the film as shown in FIG. 2 allows for film passage through a take-up reel so that the function of the take-up reel in this condition is essentially bypassed. The film then travels around a guide reel 24 past a cutting mechanism 25 to another guide reel 26. The film from guide roller 26 passes to a take-up reel or spool 28 through an aperture 29 within the spool. The aperture 29 is arranged to allow the film free passage through the aperture when the aperture is aligned as shown in FIG. 2. The film then passes over two guide rollers 31 and 32 to an exit slot 33 from magazine E and to an entrance slot 34 of magazine F. The film thence guided by guide reel 36 is passed onto reel B where it is in mating union with mat C. The mat material is carried on a mat supply spool 40 which is pivotally mounted on a bell crank 41 hinged at 42 and spring-urged by spring 43 to urge the mat against film and mat take-up reel B, so that the mat is compressed with the appropriate pressure to create the requisite mating union between the mat and film for processing. Take-up reel B is powered by a constant torque motor 50 so that in normal operation the film is passed through magazine E into magazine F for processing union with the mat material.

If it is desired to remove film that has been wound on reel B while there is still remaining film in camera D this may be done by cutting the film with the cutting mechanism 25. The cutting mechanism 25 is actuated by a lever arm 60 which causes blade 61 to cut and sever the film as the blade passes through a blade guide 62. The film take-up reel 23 is then operated by a motor 64 to move in a counter clockwise direction wherein the lead end of the film A from the camera is wrapped onto spool 23 and is so held by a pressure roller 66, as seen in FIG. 3. Motor 64 is of a constant torque type so that it can continually spool film from the camera as the film is exposed. Motor 50 thus causes the other side of the cut film to be brought onto take-up or processing reel B. In this condition magazine F can be removed from magazine E. The two magazines are held together by lever arms 68 and 69 which tightly lock the two magazines together. The film passes between the two magazines in light tight union, however, prior to removal of the magazine the two light sealing slots 33 and 34 are rotated by the two handles 70 and 71, respectively, mounted on the exterior of the two magazines. Rotation of the two slots 33 and 34 thus insures the light tight integrity of the magazines. It can thus be seen that in this condition magazine F can be removed from the camera for subsequent delivery to another location, while the camera is allowed to continually operate with the film being reeled onto take-up reel 23.

As an alternative it may be desirable to remove the processed film from magazine F and deposit same in magazine E. To accomplish this objective the film is severed by cutting mechanism 25, as previously described. In this instance, however, reel 28 is rotated in a clockwise direction by motor 75 connected to the reel, so that the tail end of the film is wound onto the reel. A pressure reel 76 is mounted adjacent to the take-up reel 28 to frictionally hold the tail end of the film onto the reel. At the same time motor 64 operates to wind the film from the camera in the manner as heretofore discussed. When reel 28 rotates, the film is withdrawn from the processing reel B and onto reel 28. During this stage of operation the mat reel or spool 40 is rotated in a counterclockwise direction in order to cause the mat to rewind onto reel 40. This is accomplished by energizing a motor 80 connected to spool 40. Shaft 81 of spool 40 projects to the exterior of magazine F and is allowed free motion via the bell crank 41 via slot 83, so that reel spool 40 can be rotated while allowing the full unrestricted motion afforded by the bell crank. An exterior housing 85 is provided to retain the light tight integrity of the magazine and covers the motor 80 and slot 83. It can thus be seen that in this condition of operation the processed film on take-up reel B will be transferred to reel 28, and the processed mat material will be rewound onto reel 40. When the aforesaid transfer is complete magazine F is removed from magazine E, as previously discussed. Prior thereto slots 33 and 34 are turned to retain the light tight integrity of both magazines. It can thus be seen that the mat material with its processed positive image is transferred with magazine F to a desired location. The processed negative film is completely contained on reel 28. At the same time reel 23 functions to continuously withdraw film from the camera as it is subsequently exposed, whereafter the film on reel 23 can be processed in the conventional manner.

It can thus be seen that the aforesaid structure allows for great flexibility of operation in which film can be carried and processed in a removable magazine either partially or totally in such a manner that the partial or total processed film can be removed from the camera while allowing the remaining film in the camera to be continuously spooled, or, alternatively, the above camera action can be maintained and at the same time the processed film can be re-entered and spooled, so that the magazine can be removed having only the processed positive mat material contained therein. It is noted that all of the operations above explained are adaptable for occurring in complete light tight integrity.

While the specific embodiment of this invention has been described as a magazine for a camera it is to be understood that the same structure and flexibility can be afforded for processing units apart from a camera where the features and advantages of this invention may be required.

While one embodiment of this invention has been shown and described, it will be apparent that other adaptations and modifications can be made without departing from the true spirit and scope of the invention.

What is claimed is:

1. A mechanism for handling photographic material of the type having photographic film with an emulsion side adapted to create a latent image when exposed to light and a mat having a developing solution impregnated within an emulsion side of the mat and in which development of the latent image on the film is caused by action of the developer carried by the mat when an intimate contact between the emulsion of the photographic film and the emulsion of the mat is effected, comprising a first reel adapted to carry the mat, a second reel adapted to receive the film and mat, means to track the mat and film onto the second reel with the emulsion side of each in face-to-face contact under pressure, means to rotate said second reel to cause said film and mat to take-up on the second reel, guide means to guide the film through a first, second and third stretch, means to guide said film from said third stretch onto said second reel, means to guide film in entrance to said first stretch, means to sever said film along said second stretch, third reel means to engage said film along said first stretch to spool the film in entrance after said second film stretch is severed, and fourth reel means engageable with the film along said third stretch to spool film from said second reel when said second film stretch is severed.

2. A mechanism for handling photographic material of the type having photographic film with an emulsion side adapted to create a latent image when exposed to light and a mat having a developing solution impregnated within an emulsion side of the mat and in which development of the latent image on the film is caused by action of the developer carried by the mat when an intimate contact between the emulsion of the photographic film and the emulsion of the mat is effected, comprising a first reel adapted to carry the mat, a second reel adapted to receive the film and mat, means to track the mat and film onto the second reel with the emulsion side of each in face-to-face contact under pressure, means to rotate said second reel to cause said film and mat to take-up on the second reel, guide means to guide the film through a first, second and third stretch, means to guide said film from said third stretch onto said second reel, means to guide film in entrance to said first stretch, means to sever said film along said second stretch, a third reel, a slit formed in said third reel, said first stretch of film passing through said slit, a fourth reel, a slit formed in said fourth reel and said third stretch of film passing through said slit in said fourth reel, means to rotate said third and fourth reels after said film is severed along said second stretch to cause said first stretch to spool onto said third reel and to said third stretch to spool onto said fourth reel.

3. A mechanism according to claim 2 and wherein means are provided to rotate said first reel to respool the mat onto said first reel when said fourth reel is rotated.

4. A mechanism for handling photographic material of the type having photographic film with an emulsion side adapted to create a latent image when exposed to light and a mat having a developing solution impregnated within an emulsion side of the mat and in which development of the latent image on the film is caused by action of the developer carried by the mat when an intimate contact between the emulsion of the photographic film and the emulsion of the mat is effected, comprising a first magazine adapted to be mounted onto a film carrying unit in light tight unison therewith, a second magazine, means to removably mount said second magazine onto said first magazine, said second magazine carrying a first reel adapted to carry the mat, a second reel adapted to receive the film and mat, means to track the mat and film onto the second reel with the emulsion side of each in face-to-face contact under pressure, and means to rotate said second reel to cause said film and mat to take-up on the second reel and said first magazine having therewithin guide means to guide the film through a first, second, and third stretch, means to guide said film from said third stretch into said second magazine, means to guide film from said film carrying unit to said first stretch, means to sever said film along said second stretch, a pair of reels mounted adjacent said first and third stretches of film, and means to wind the film at said first and third stretches onto said two reels when said film is severed along said second stretch.

5. A mechanism for handling photographic material of the type having photographic film with an emulsion side adapted to create a latent image when exposed to light and a mat having a developing solution impregnated within an emulsion side of the mat and in which development of the latent image on the film is caused by action of the developer carried by the mat when an intimate contact between the emulsion of the photographic film and the emulsion of the mat is effected, comprising a first magazine mounted onto an exposed film housing, means within said first magazine to track said film through the magazine to an exit port, a second magazine removably mountable onto said first magazine to receive film from said first magazine, mat carrying means within said second magazine to combine the mat and film in processing union within said second magazine, means within said first magazine to sever said film within the first magazine, first reel means within said first magazine to spool the severed end of film from said exposed film housing and second reel means within said first magazine to spool the other severed end of the film from said second magazine.

References Cited by the Examiner

UNITED STATES PATENTS 3,041,952  7/1962  Schreck _____ 95—14

FOREIGN PATENTS 732,402  6/1955  Great Britain.

JOHN M. HORAN, *Primary Examiner.*